Oct. 14, 1958 K. BOLLINGER 2,856,259
METHOD FOR PURIFYING AIR CONTAMINATED BY ACID
OR NITROUS IMPURITIES
Filed Dec. 2, 1950 2 Sheets-Sheet 1

INVENTOR
KARL BOLLINGER
By Karl Michaelis
ATTORNEY

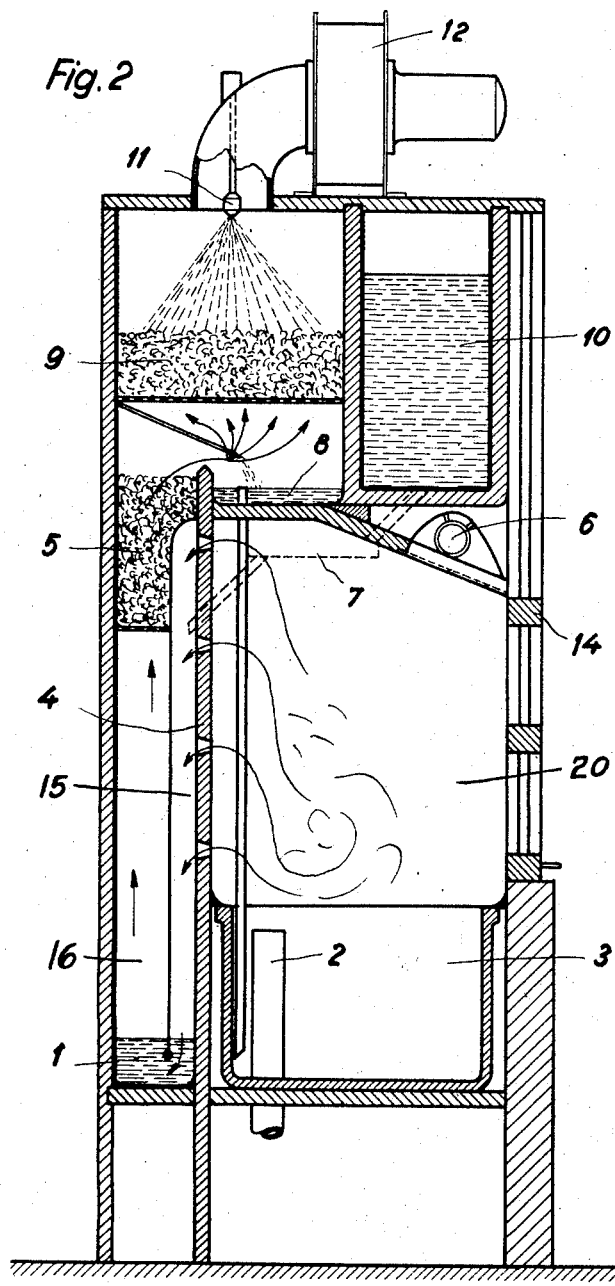

United States Patent Office 2,856,259
Patented Oct. 14, 1958

2,856,259

METHOD FOR PURIFYING AIR CONTAMINATED BY ACID OR NITROUS IMPURITIES

Karl Bollinger, Wimmis, Switzerland, assignor to Colasit A. G., Wimmis, Switzerland, a joint-stock company of Switzerland Application December 2, 1950, Serial No. 198,770

Claims priority, application Switzerland December 8, 1949

7 Claims. (Cl. 23—4)

This invention relates to air purification, and more particularly to methods for purifying air contaminated by acid or nitrous impurities.

It is an object of this invention to provide a method of removing acid or nitrous impurities from air which is more efficient than existing processes.

Another object of this invention is to provide an apparatus for the purpose described which requires materially less space than existing apparatus of this kind.

A further object of the invention is to provide a process in the carrying out of which the most important parts of the apparatus, such as discharge channels and the fan, are not exposed to corrosive influences and therefore, need not consist of high-priced material.

Other objects, and the manner in which the same are attained, will become apparent as this specification proceeds.

Up to now, industrial methods for removing acid and nitrogenous gases and vapor from air have been developed more or less along the lines of the well-known processes for making acids, i. e. the air containing the impurities was washed, in counter-current, with water or solutions of basic reaction. This procedure, however, requires a number of tall scrubbers. Moreover, water alone is rarely if ever capable of completely removing nitrogenous gases, as in accordance with the equation $$3NO_2 + H_2O \rightarrow 2HNO_3 + NO$$

nitric oxide—which is practically insoluble in water—is always formed, in considerable quantity.

I have now found that the reaction of acid and nitrous impurities with basic binding agents is materially accelerated if it takes place in the presence of a large-surface material. The accelerating effect is still increased and enhanced by impregnation of the porous substance, with catalytic agents. The catalytic agents employed for this purpose may derive from impurities of the raw-material for the large-surface material, e. g. from the metal compounds present in the wood from which activated carbon has been obtained, or else they may be added to the raw-material, or to the large-surface material made therefrom.

The present invention contemplates removing acid and nitrous impurities from air, by passing the air through a basic liquid, a layer of a large-surface material, and a similar, water-irrigated layer. The invention involves the method as well as apparatus wherein to carry it out.

Referring first to the process, when the air passes through the basic liquid contained in a header, basic substance is carried along in the form of a gas or mist. Part of the impurities, therefore, may already enter into reaction with the base, in the container as well as on the layer of large-surface material. It may be a solution of a substance of basic reaction, a solution of hydroxides or of a compound giving a basic reaction due to hydrolysis, such as, for example, Na—, K—, or Ca— base, the carbonates and hydrocarbonates of Na, K, or $NH_4$, alkali-aluminates and -zincates, etc.

The large-surface material may be activated carbon; impregnated material, however, is preferred for this purpose. Preferred embodiments of large-surface material may be obtained as described in the following examples:

*Example I*

100 parts by weight of wood powder are kneaded together with 150 parts of by weight of a 50% solution of ferric chloride, and the resulting mass is pressed, in a granulating machine, into grains of a diameter of 10–15 mm. The compressed grains thus obtained are baked at 650° C.

*Example II*

Pieces of pumice stone, as uniform as possible in size and other characteristics, are impregnated, in the cold, with a concentrated solution of ferric acetate, and then dried and baked.

The material made in accordance with the above examples or in a similar manner, is used in the filters, in the form of pieces the size of peas or nuts.

The mixing ratios are so selected that ordinarily, about 10% of metal compounds remain in the baked material; these ratios, however may be varied according to requirements.

In place of the pumice stone referred to in Example II, burned porous clay, asbestos, or diatomaceous earth, etc., or mixtures of these materials, pressed in suitable molds, may also be employed.

The large-surface material may contain as the catalytic impregnation medium, apart from iron compounds, at least one of the following metals in the form of an insoluble compound: Ni, Co, Al, Ti, U, Zn, Pb, Sn, Sb, Cd, Cu, Bi, etc.

The large surface of the material facilitates and increases the contact between the impurities and the basic substance. The not readily soluble metal compound, moreover, has a catalytic effect so that the impurities are reacted with and bound, almost instantaneously.

A second, water-irrigated layer of the same large-surface material is provided for the purpose of removing small remnants of impurities which were not affected by the first catalytic layer.

The air which is passed through the apparatus by the suction of a fan, emerges free from acid and nitrous fumes. For this reason, the discharge conduits as well as the fan may be made of iron without danger of corrosion. This fact, as well as the small size of the apparatus, constitute important advantages.

In the drawing accompanying this specification and forming part thereof, one embodiment of an apparatus according to the invention, particularly adapted for the purification of air derived from metal pickling plants, is illustrated diagrammatically by way of example.

In the drawing,

Fig. 2 is a side view, in section, of an apparatus according to the invention.

Figure 1:
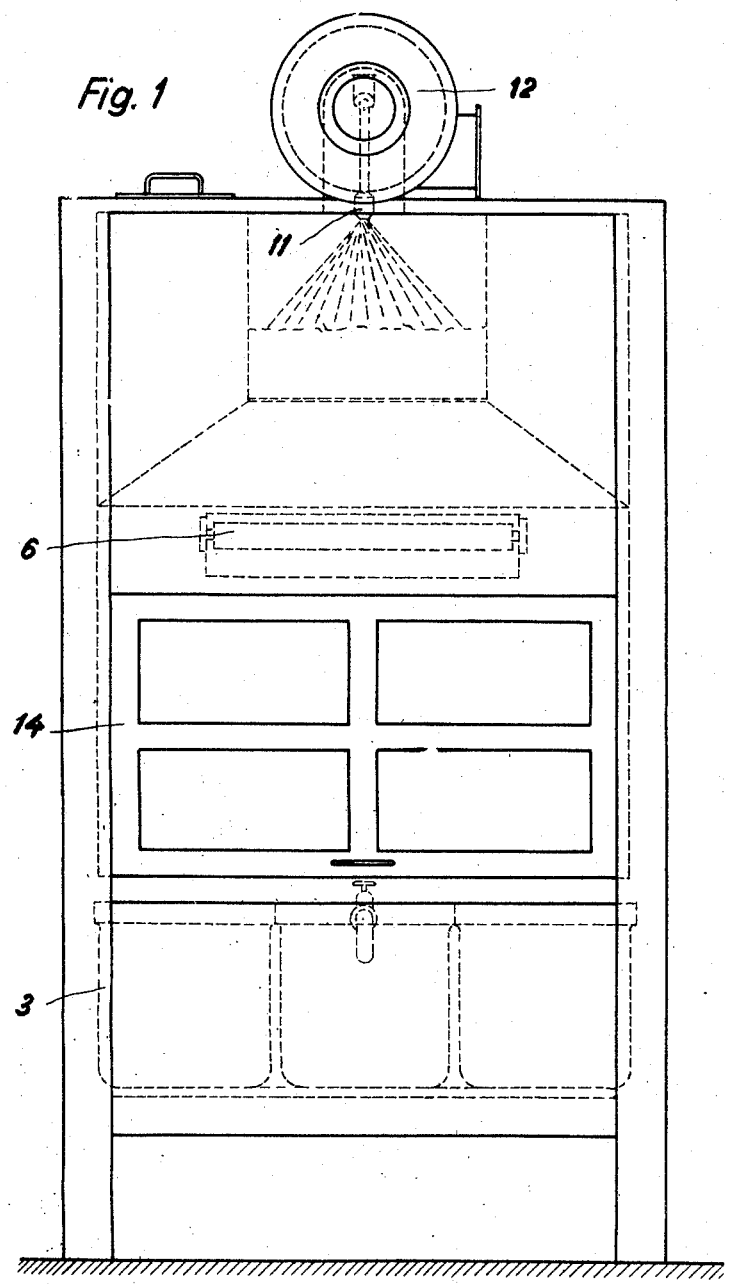
Fig. 1 is a front view.

Referring now to the drawing, the apparatus has a compartment 20 which may be closed by a window 14 and which contains the troughs 3 for acid and rinsing water, as well as the light fixture 6. Besides, the apparatus comprises a header 1 for the basic liquid; a first layer 5 of large-surface material, the volume of which e. g. may be 50 l., and a second layer 9 of similar material and a volume of e. g. 40 l. A storage container 10 for the basic liquid, with a capacity of e. g. 100 l., is arranged above the compartment 20; the basic liquid passes from this storage container 10 into the automatic drop device 7 where it is admixed to the contaminated air which carries it along into the header 1.

The fumes and vapors generated by the work in the troughs 3 and the air in the compartment 20, pass through apertures in the partition 4 to mix, in the channel 15, with the liquid dripping from the drop device 7, and to pass thereafter, through the liquid seal 1, the channel 16, the first layer of large-surface material 5 and finally, the second water-irrigated layer 9 of similar material.

The irrigation with water of the layer 9 is affected by the nozzle 11 at a rate of e. g. 5–15 l. per hour.

The fan 12 causes the air to pass through the device at a rate of e. g. 6–10 m.$^3$ per minute, corresponding to an air velocity of about 0.1–0.3 m./sec. in the apertures in rear wall 4.

Various changes in the construction, design and operation of the invention as shown and described, may be made within the scope of the appended claims without departing from the spirit of the invention or sacrificing any advantages thereof.

I claim:

1. The process of freeing air from acid and nitrogenous gases and vapors contaminating it which comprises admixing with the air an aqueous solution of a substance of basic reaction in the form of a mist, conducting the mixture thus formed through a layer of granular large-surface material and washing out the neutral substances thus formed with water in a second layer of like material the two layers being so disposed that the water from the second layer does not come into contact with the first layer.

2. The process of freeing air from acid and nitrogenous gases and vapors contaminating it which comprises admixing with the air an aqueous solution of a substance of basic reaction in the form of a mist, conducting the mixture thus formed through two layers, arranged in series, of granular large-surface material selected from the group consisting of carbon, pumice stone, burnt porous clay and asbestos the second layer being irrigated with water, and the two layers being so disposed in relation to each other that the draining irrigation water does not come into contact with the first layer.

3. The process of claim 2, in which the large surface material is active carbon impregnated with an oxide of iron.

4. The process of claim 2, in which the large-surface material is active carbon impregnated with a metal compound stemming from the wood which formed the raw material for the active carbon.

5. The process of freeing air from acid and nitrogenous gases and vapors contaminating it which comprises admixing with the air an aqueous solution of a substance of basic reaction in the form of a mist, conducting the mixture thus formed through two layers, arranged in series, of granular large-surface material selected from the group consisting of carbon, pumice stone, burnt porous clay and asbestos, said material being impregnated with an insoluble compound of a metal selected from the group consisting of iron, cobalt, aluminum, titanium, uranium, zinc, lead, tin, cadmium, copper and bismuth the second layer being irrigated with water, and the two layers being so disposed in relation to each other that the draining irrigation water does not come into contact with the first layer.

6. The process of claim 5, in which the insoluble metal compound is an oxide.

7. The process of claim 5, in which the insoluble metal compound is an oxide of iron.

References Cited in the file of this patent

UNITED STATES PATENTS

| | | |
|---|---|---|
| 1,029,528 | Bosch et al. | June 11, 1912 |
| 1,345,220 | Nielsen | June 29, 1920 |
| 1,519,470 | Wilson | Dec. 16, 1924 |
| 1,520,437 | Pipkin | Dec. 23, 1924 |
| 1,610,228 | Jones et al. | Dec. 14, 1926 |
| 1,786,361 | Pahl | Dec. 23, 1930 |
| 1,838,577 | Schuftan | Dec. 29, 1931 |
| 1,957,130 | Bartling et al. | May 1, 1934 |
| 1,984,971 | Herold et al. | Dec. 18, 1934 |
| 2,611,680 | Ruth | Sept. 23, 1952 |

FOREIGN PATENTS

| | | |
|---|---|---|
| 2,678 | Great Britain | July 28, 1875 |